US012646883B2

(12) United States Patent
Li et al.

(10) Patent No.: US 12,646,883 B2
(45) Date of Patent: Jun. 2, 2026

(54) CONNECTOR AND CONNECTOR ASSEMBLY

(71) Applicant: Tyco Electronics (Shanghai) Co., Ltd., Shanghai (CN)

(72) Inventors: Xinlei (Tony) Li, Shanghai (CN); Hailong (Sanders) Yan, Shanghai (CN); Hua (Andy) Li, Shanghai (CN); Hongqiang (Sean) Han, Shanghai (CN); Jiayuan Luo, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 230 days.

(21) Appl. No.: 18/361,197

(22) Filed: Jul. 28, 2023

(65) Prior Publication Data

US 2024/0039199 A1 Feb. 1, 2024

(30) Foreign Application Priority Data

Jul. 29, 2022 (CN) ......................... 202210915355.8
Nov. 24, 2022 (CN) ......................... 202211483906.4

(51) Int. Cl.

| | |
|---|---|
| ***H01R 13/405*** | (2006.01) |
| ***H01R 13/03*** | (2006.01) |
| ***H01R 13/24*** | (2006.01) |
| ***H01R 13/504*** | (2006.01) |
| ***H01R 13/516*** | (2006.01) |

(52) U.S. Cl.

CPC ....... *H01R 13/405* (2013.01); *H01R 13/2407* (2013.01); *H01R 13/504* (2013.01); *H01R 13/516* (2013.01); *H01R 13/03* (2013.01)

(58) Field of Classification Search

CPC ......................... H01R 13/405; H01R 13/2407; H01R 13/504; H01R 13/516; H01R 12/52; H01R 12/716; H01R 13/03
USPC ................................................. 439/733.1, 74
See application file for complete search history.

(56) References Cited

U.S. PATENT DOCUMENTS 4,737,115 A * 4/1988 Seidler ................. H05K 3/3405 439/876
5,915,975 A * 6/1999 McGrath .............. H01R 12/716 439/74
6,501,665 B1 * 12/2002 Ted ...................... H05K 7/1023 439/82
6,530,788 B1 * 3/2003 Ju .......................... H01R 12/57 439/876
7,377,795 B2 * 5/2008 Vicich .................. H05K 3/3426 439/83
8,100,700 B2 * 1/2012 Chen ........................ H01R 4/02 439/83
8,235,734 B2 * 8/2012 Ju ........................ H05K 7/1069 439/83
8,246,360 B1 * 8/2012 Tsai ....................... H01R 12/55 439/83

(Continued)

*Primary Examiner* — Gary F Paumen
(74) *Attorney, Agent, or Firm* — Barley Snyder

(57) ABSTRACT

A connector comprises an insulation body, a plurality of signal terminals held in the insulation body and adapted to transmit signals, and a plurality of power supply terminals held in the insulation body and adapted to supply power. The power supply terminals of the connector are adapted to engage with power supply terminals of a mating connector such that the power supply terminals engaged together are connected in parallel.

22 Claims, 6 Drawing Sheets

(56) References Cited

U.S. PATENT DOCUMENTS

| | | | | |
|---|---|---|---|---|
| 8,360,790 B2 * | 1/2013 | Ju | H01R 12/716 | 439/83 |
| 8,414,311 B2 * | 4/2013 | Ju | H01R 12/89 | 439/83 |
| 8,708,716 B1 * | 4/2014 | Ho | H01R 12/714 | 439/83 |
| 8,894,423 B2 * | 11/2014 | Mongold | H01R 12/00 | 439/83 |
| 2005/0095881 A1 * | 5/2005 | Fan | H01R 12/716 | 439/74 |
| 2009/0088016 A1 * | 4/2009 | Liao | H05K 3/3426 | 439/357 |
| 2011/0294316 A1 * | 12/2011 | Chen | H01R 12/58 | 29/842 |
| 2014/0134854 A1 * | 5/2014 | Ho | H01R 12/57 | 439/83 |
| 2014/0242817 A1 * | 8/2014 | Mongold | H01R 13/02 | 439/83 |

* cited by examiner

CONNECTOR AND CONNECTOR ASSEMBLY

CROSS-REFERENCE TO RELATED APPLICATIONS

This application claims the benefit of Chinese Patent Application Nos. CN 202210915355.8 filed on Jul. 29, 2022, and CN 202211483906.4 filed on Nov. 24, 2022, in the China National Intellectual Property Administration, the whole disclosures of which are incorporated herein by reference.

FIELD OF THE INVENTION

Embodiments of the present disclosure relate to a connector and a connector assembly including the same.

BACKGROUND

In the related prior art, for a connector having a mixture of power supply terminals and signal terminals, the power supply terminals may be required to transmit a current up to, for example, 100 amperes. This can be difficult to achieve in some connectors with a relatively small height. More specifically, it is very difficult to transmit a large amount of current while keeping the shape of the connector itself low in profile.

SUMMARY

According to an embodiment of the present disclosure, a connector comprises an insulation body, a plurality of signal terminals held in the insulation body for transmitting signals, and a plurality of power supply terminals held in the insulation body for supplying power. The power supply terminals of the connector are adapted to engage with power supply terminals of another mating connector such that the power supply terminals engaged together are connected in parallel.

BRIEF DESCRIPTION OF THE DRAWINGS

The invention will now be described by way of example with reference to the accompanying Figures, of which.

DETAILED DESCRIPTION OF THE EMBODIMENTS

Figure 1:
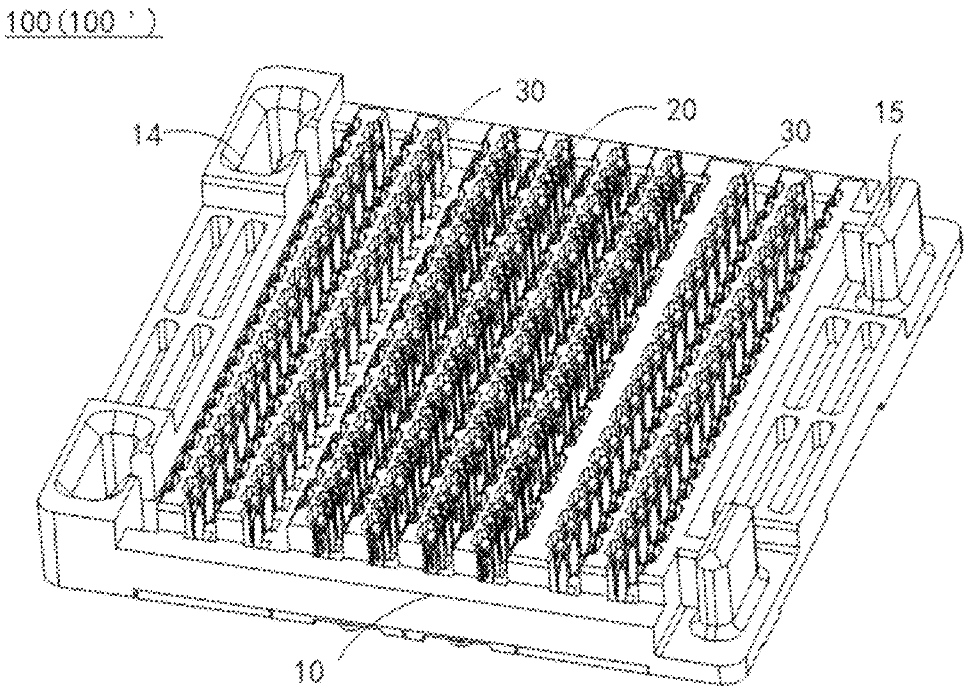
FIG. 1 is a schematic perspective view showing a connector according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A connector according to an embodiment of the present disclosure includes an insulation body, a plurality of signal terminals held in the insulation body for transmitting signals, and a plurality of power supply terminals held in the insulation body for supplying power. The power supply terminals of the connector are adapted to engage with power supply terminals of another mating connector such that the power supply terminals engaged together are connected in parallel.

According to another embodiment of the present disclosure, a connector assembly includes two of the abovementioned connectors. The power supply terminals of either one of the two connectors are engaged with the power supply terminals of the other one of the two connectors, and the power supply terminals engaged together are connected in parallel when the two connectors are mated together.

As shown in FIGS. 1, 2, 4 and 7, each of the connectors 100, 100' (i.e., a connector and a mating connector) according to embodiments of the present disclosure includes an insulation body 10, a plurality of signal terminals 20 and a plurality of power supply terminals 30. The plurality of signal terminals 20 are held in the insulation body 10 and are adapted to transmit signals. The plurality of power supply terminals 30 are held in the insulation body 10 and adapted to supply power. When two connectors are mated, the power supply terminals 30 of either one of the two connectors 100, 100' are adapted to engage with the power supply terminals of the other one of the two connectors. The plurality of pairs of power supply terminals 30 engaged together are connected in parallel to provide a relatively large current, such as 100 amperes or higher.

In an exemplary embodiment, a height of the power supply terminal 30 of the connector 100,100' extending from the insulation body 10 along a mating direction Z toward the other connector 100, 100' is the same as a height of the signal terminal 20 extending from the insulation body along the mating direction Z toward the other connector 100, 100', thereby keeping the height of the connector assembly minimized while transmitting relatively the large current.

In an exemplary embodiment, the insulation body 10 is provided with a plurality of first slots 12. The plurality of first slots 12 are arranged in at least one row along a width direction Y of the insulation body 10. The plurality of signal terminals 20 are positioned on both sides of each row of the first slots 12.

Figure 11:
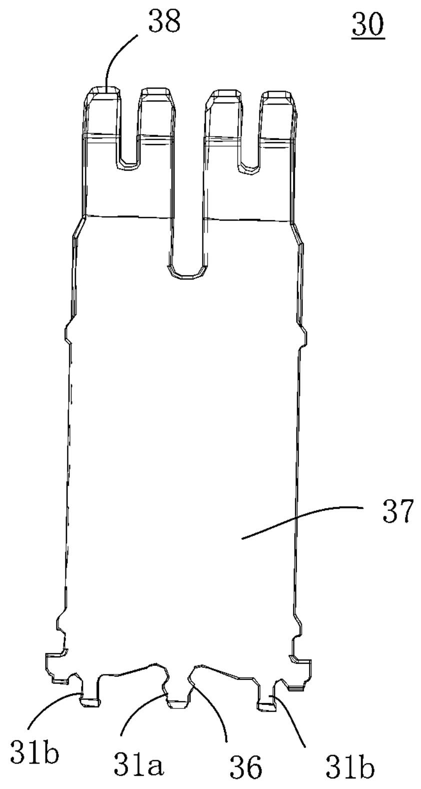
FIG. 11 is a schematic view showing a power supply terminal of the connector shown in FIG. 7.
Figure 12:
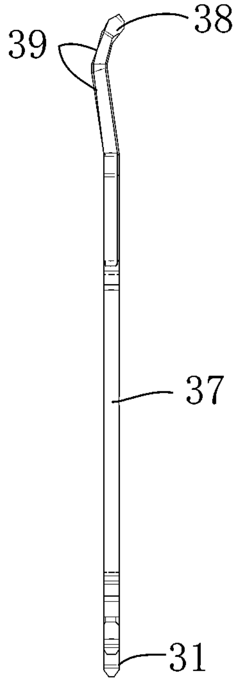
FIG. 12 is a schematic side view showing the power supply terminal shown in FIG. 11.

In an exemplary embodiment, as shown in FIGS. 11 and 12, each power supply terminal includes a pin 31, a plurality of electrical contact points 38, and a connecting portion 37 connected between the pin and the plurality of electrical contact points. When the two connectors 100, 100' are mated, the plurality of electrical contact points 38 of the power supply terminal 33 of either one of the two connectors are adapted to be in contact with the plurality of electrical contact points of the power supply terminal of the other or mating connector. In this way, the plurality of electrical contact points 38 can greatly improve the contact stability when transmitting the large current. As shown in FIG. 12, a section of the connecting portion 37 close to the electrical contact points 38 has an arc structure 39 in order to reduce an insertion and extraction force during the insertion and extraction process of the two connectors 100, 100'.

In an exemplary embodiment, as shown in FIG. 11, the pin 31 includes a middle pin 31*a* and a side pin 31*b* located on either side of the middle pin. Two side pins 31*b* are shown in this embodiment. However, in some other embodiments of the present disclosure, only one side pin 31*b* may be provided on one side of the middle pin 31*a*.

Figure 8:
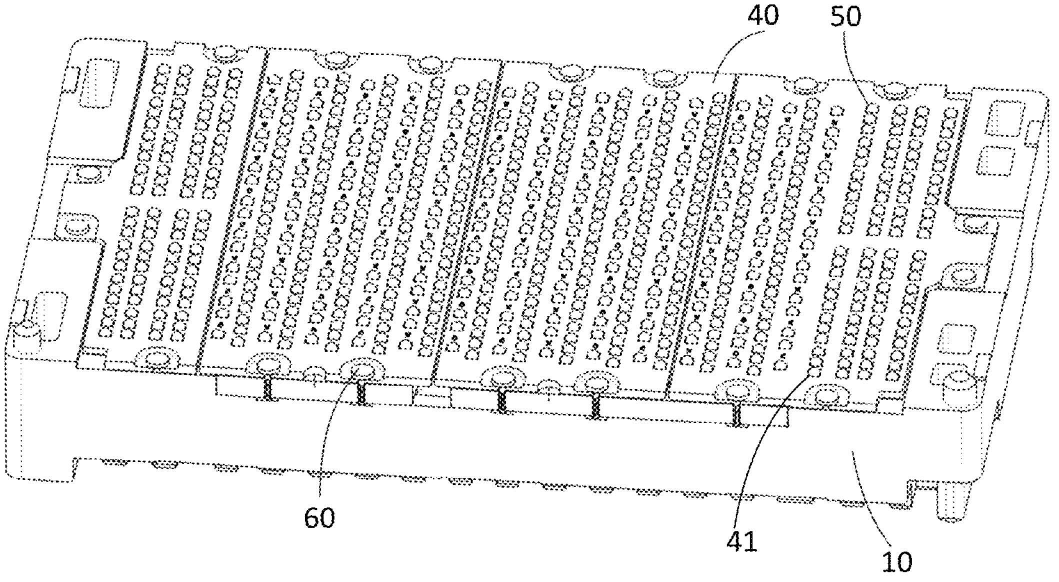
FIG. 8 is a perspective view of the connector shown in FIG. 7 from another angle.
Figure 9:
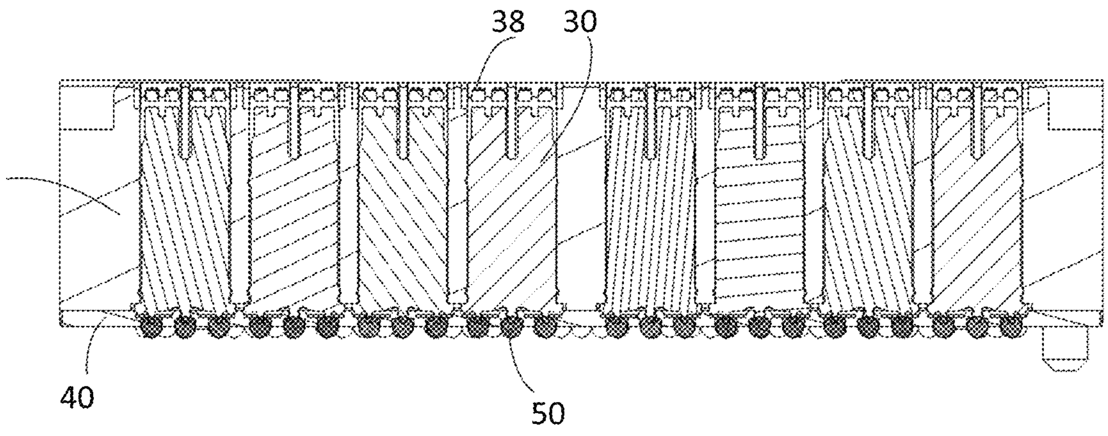
FIG. 9 is a schematic cross-sectional view showing the connector shown in FIG. 7.
Figure 10:
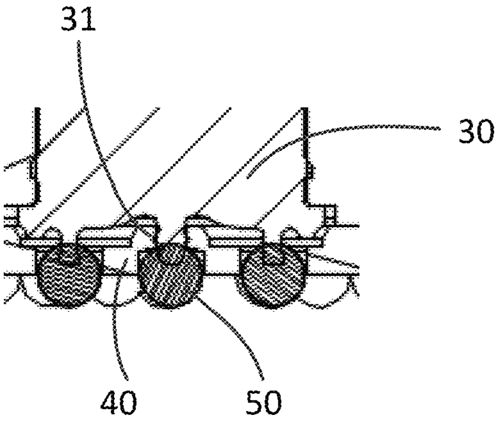
FIG. 10 is a partially enlarged view showing the connector shown in FIG. 9.

In an exemplary embodiment, as shown in FIGS. 9 and 10, the connector 100, 100' further includes a welding ball 50 connected to the pin 31 of the corresponding power supply terminal 30. As shown in FIGS. 8-10, the connector 100, 100' further includes a spacer 40 made of, for example, insulating materials such as plastic. The spacer 40 is attached to a side of the insulation body 10 away from the other connector 100', 100 and has a physical portion positioned between the adjacent welding balls 50. Specifically, as shown, the spacer 40 may be a plate-like member having a plurality of separated accommodating holes 41, with one welding ball 50 is accommodated in each accommodating hole. The welding ball 50 has a welding portion exposed from the accommodating hole 40 to be welded to the circuit board. In some examples, the portion of each welding ball 50 connected to the pin 31 is at least partially positioned within the accommodating hole 41. For example, except for the welding portion, other portions of the welding ball 50 are housed or surrounded in the corresponding accommodating hole 41 so that the welding balls are separated from each other. The spacer 40 may be, for example, fixed to the insulation body 10 by the riveting member 60.

In an exemplary embodiment, as shown in FIG. 10, the middle pin 31*a* is formed with a locking portion 36 adapted to interfere with the spacer 40 to prevent the spacer from being separated from the insulation body 10 of the connector 100,100'. This locking portion 36 may, for example, adopt a barbed structure. In such embodiment, an outer edge of the spacer 40 is thermally riveted on the insulation body 10, and the locking portion 36 on the middle pin 31*a* interferes with the spacer so that an inner portion of the spacer can be reliably attached to the insulation body. This avoids the occurrence of an excessive gap between the spacer 40 and the insulation body 10 due to warping of the spacer after the reflow soldering process (the product will be soldered on the customer's PCB by the reflow soldering process when used by the customer), which in turn affects the coplanarity and signal integrity (SI) performance of the welding ball 50.

Figure 3:
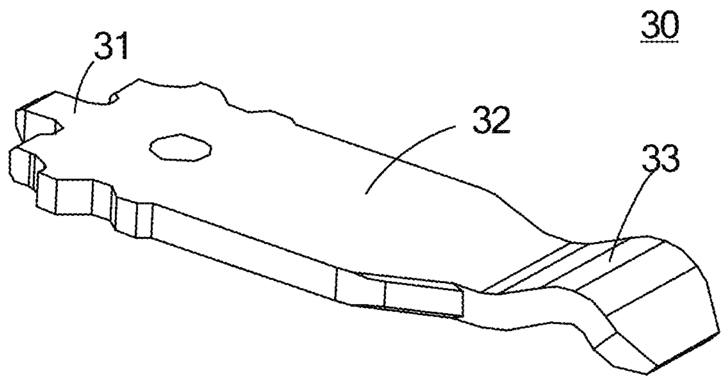
FIG. 3 is a schematic perspective view showing a power supply terminal of the connector shown in FIG. 1.

In an exemplary embodiment, as shown in FIG. 3, each power supply terminal 30 includes a pin 31 and an electrical contact portion 32 extending therefrom. A free end of the electrical contact portion 32 is formed with a raised elastic contact portion 33. When the two connectors 100, 100' are mated, the elastic contact portion 33 of the power supply terminal 30 of either one of the two connectors is adapted to be in electrical contact with the electrical contact portion 32 of the power supply terminal of the other connector.

Figure 2:
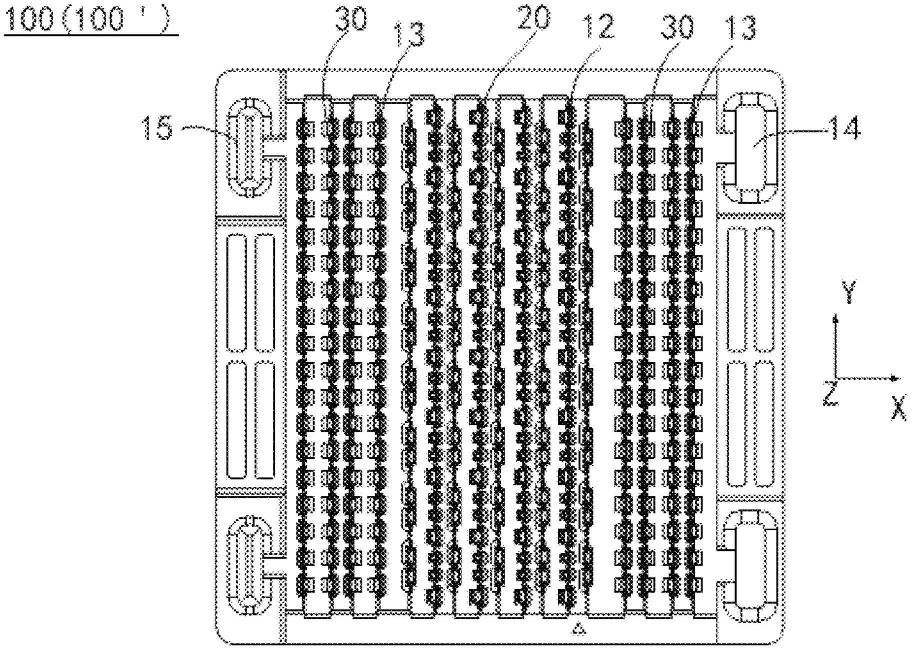
FIG. 2 is a plane view of the connector shown in FIG. 1.
Figure 7:
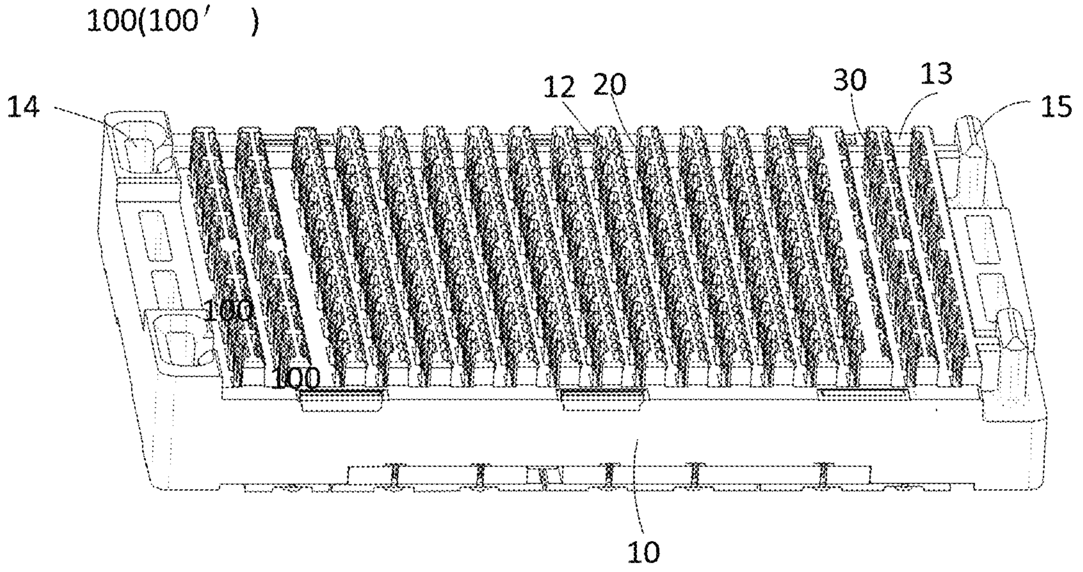
FIG. 7 is a schematic perspective view showing a connector according to an exemplary embodiment of the present disclosure.

In an exemplary embodiment, as shown in FIGS. 1, 2 and 7, the insulation body 10 is provided with a plurality of second slots 13. The plurality of second slots 13 are divided into two groups. The two groups of second slots 13 are symmetrically located on both sides of the plurality of first slots 12 along a length direction X of the insulation body 10 and arranged in at least one row along the width direction Y of the insulation body. The plurality of power supply terminals 30 are located on both sides of each row of second slots 13. In this way, the two connectors 100, 100' can have exactly the same structure, that is, the connectors have a hermaphrodite structure, so there is no need to manufacture two different connectors for mating. This simplifies required tooling and molds, and reduces the manufacturing cost of the connector assembly. It should be noted that, in some other exemplary embodiments, the second slots 13 may also be located in the middle or other sections of the insulation body 10 in the length direction X.

Figure 4:
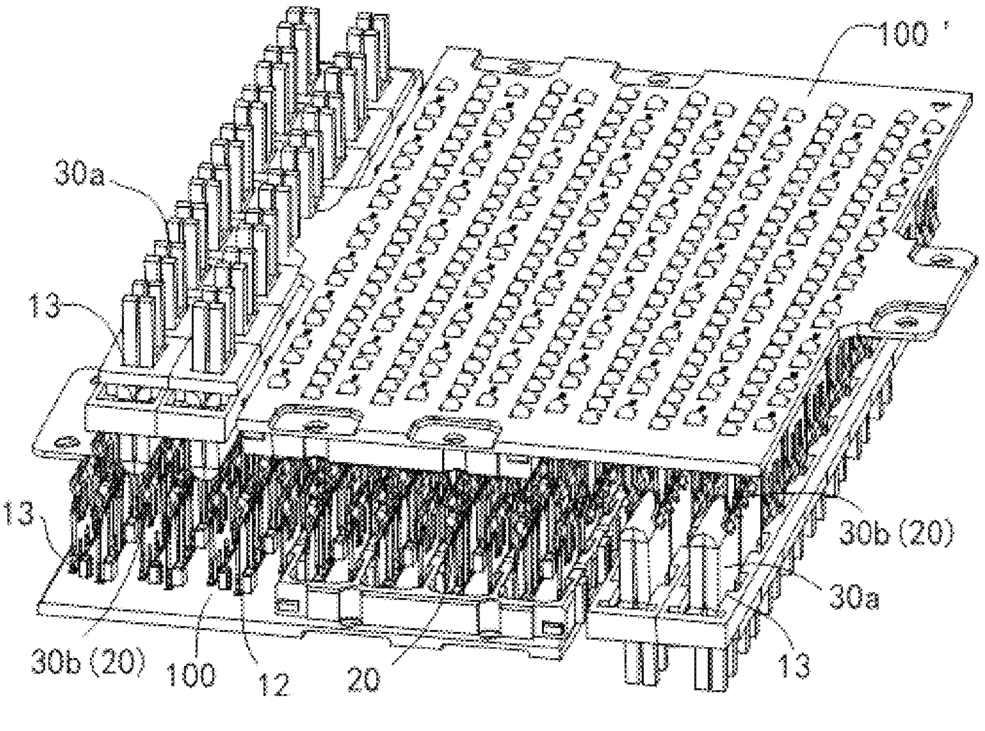
FIG. 4 is a schematic perspective view showing a connector assembly according to an exemplary embodiment of the present disclosure.
Figure 5:
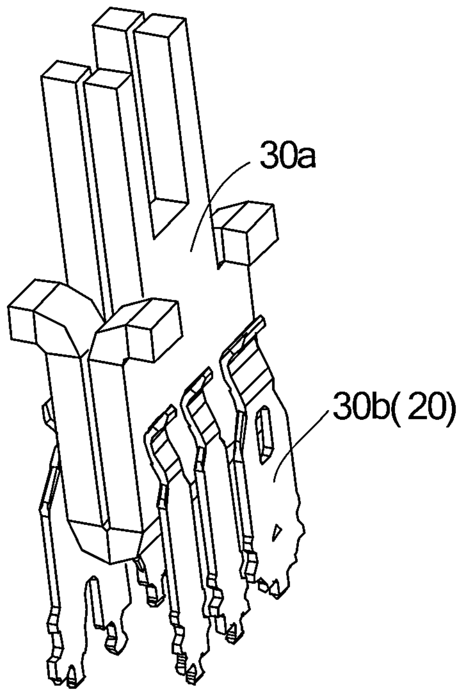
FIG. 5 is a schematic perspective view showing power supply terminals of two connectors of the connector assembly shown in FIG. 4 electrically connected to each other.
Figure 6:
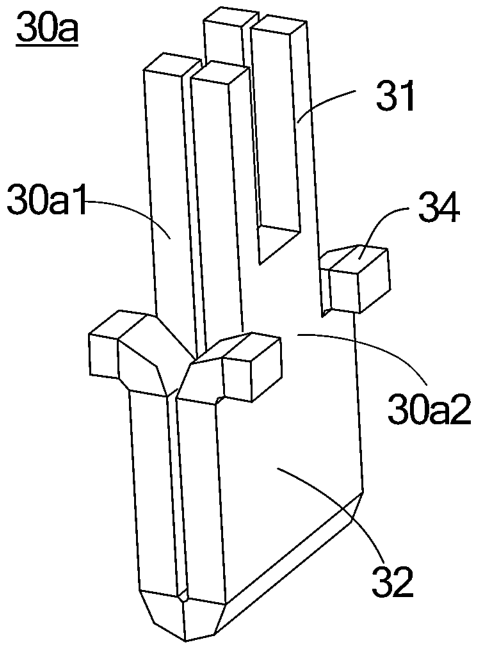
FIG. 6 is a schematic perspective view showing the power supply terminal shown in FIG. 5.

As shown in FIGS. 4-6, the power supply terminals 30 include a first power supply terminal 30*a* and a second power supply terminal 30*b*. When the two connectors 100, 100' are mated, the first power supply terminal 30*a* of either one of the two connectors 100, 100' is adapted to engage with the second power supply terminal 30*b* of the other connector. In other words, the first power supply terminal 30*a* of the connector 100 is engaged with the second power supply terminal 30*b* of the other connector 100', and the second power supply terminal 30*b* of the connector 100 is engaged with the first power supply terminal 30*a* of the other connector 100'. The plurality of pairs of first power supply terminals 30*a* and second power supply terminals 30*b* engaged together are connected in parallel to provide a relatively large current carrying capacity, such as 100 amperes or higher. In an exemplary embodiment, as shown in FIGS. 4 and 5, the size and structure of the second power supply terminal 30*b* are exactly the same as those of the signal terminal 20. In other words, the second power supply terminal 30*b* can be replaced by the signal terminal 20.

Referring to FIG. 4, the first power supply terminal 30*a* is made of a plate with high conductivity, for example, a copper plate. The first power supply terminal 30*a* includes a first plate-like portion 30*a*1 and a second plate-like portion 30*a*2 stacked with the first plate-like portion. The first plate-like portion 30*a*1 and the second plate-like portion 30*a*2 each include a pin 31 and an electrical contact portion 32 extending therefrom. In this way, a thickness of the first power supply terminal 30*a* can be increased so as to transmit the relatively large current.

The first plate-like portion 30*a*1 and the second plate-like portion 30*a*2 each include an abutting section 34 located between the pin 31 and the electrical contact portion 32. The abutting section 34 is abutted against the insulation body 10 for fixing of the first supply terminal 30*a*, when the first supply terminal is in place in the insulation body 10. In an exemplary embodiment, the first power supply terminal 30*a* is formed in one piece. For example, it can be integrally formed from a copper plate by a stamping process, so as to reduce manufacturing costs.

The insulation body 10 is provided with a plurality of second slots 13. The plurality of second slots 13 are located on one side of the plurality of first slots 12 along the length direction X of the insulation body 10 and arranged in at least one row along the width direction Y of the insulation body. The plurality of power supply terminals 30 are located on both sides of each row of second slots 13. In this way, the two connectors 100,100' for mating can have exactly the same structure (i.e., a hermaphrodite structure), thereby reducing the manufacturing cost of the connector assembly.

In the illustrated exemplary embodiments, the plurality of signal terminals 20 and the plurality of power supply terminals 30 are inserted in the insulation body 10. However, it should be understood that the plurality of signal terminals 20 and the plurality of power supply terminals 30 can also be fixed in the insulation body 10 by other means.

In an exemplary embodiment, as shown in FIGS. 1, 2 and 4, the insulation body 10 has a first end along the length direction X thereof and a second end opposite to the first end. The insulation body 10 is provided with at least one guiding structure configured to guide a mating of either one of the two connectors 100, 100' to the other connector. The guiding structure includes a guiding groove 14 and a guiding column 15. The guiding groove 14 is formed at a first end of the insulation body 10 and extends in a direction perpendicular to the insulation body. The guiding column 15 is formed at the second end of the insulation body 10. When the connector 100 is mated with the other connector 100', the guiding column 15 of the connector is adapted to engage the guiding groove 14 of the other connector, and the guiding groove 14 of the connector is adapted to engage the guiding column 15 of the other connector. In the exemplary embodiment, the number of the guiding grooves 14 is two. The two guiding grooves 14 are arranged at intervals in the width direction Y of the insulation body 10. Each guiding groove 14 defines an elongated hole having a length direction parallel to the width direction Y of the insulation body. It should be noted that, in some other embodiments of the present disclosure, the guiding groove 14 may also be a circular hole or an oval hole or the like.

According to another aspect of the present disclosure, a connector assembly includes two of the abovementioned connectors. The power supply terminals of either one of the two connectors are engaged with the power supply terminals of the other one of the two connectors. The power supply terminals engaged together are connected in parallel when the two connectors are mated together. The height of the connector assembly in the mating direction Z of the two connectors can be adjusted, for example, according to customer requirements.

According to the connector and the connector assembly of the forgoing various embodiments of the present disclosure, when the two connectors are mated the power supply terminals of the two connectors are engaged in pairs, and the plurality of pairs of engaged power supply terminals are connected in parallel to provide the relatively large current carrying capacity. In addition, the height of the power supply terminal of the connector extending from the insulation body along the mating direction toward the other connector is the same as the height of the signal terminals extending from the insulation body along the mating direction toward the other connector. This arrangement keeps the height of the connector relatively low while maximizing the current carrying capacity. Further, the connector has a hermaphroditic structure, so there is no need to manufacture two different connectors for mating, thus simplifying the mold and reducing the manufacturing cost of the connector. While the connector can transmit high-speed signals, it can also be used for power supplies, thus realizing the function of the hybrid connector. Embodiments of the present disclosure are also capable of meeting important commercial standards, such those required for UL1977 certification. In addition, the connector can increase or decrease the number of power supply terminals according to the application of different customers to realize the transmission of varied amounts of current.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

an insulation body;

a plurality of signal terminals held in the insulation body; and a plurality of power supply terminals held in the insulation body and adapted to engage with power supply terminals of a mating connector such that the power supply terminals engaged together are connected in parallel, each of the plurality of power supply terminals includes a first plate-like portion and a second plate-like portion stacked with the first plate-like portion.

2. The connector according to claim 1, wherein a height of the plurality of power supply terminals of the connector extending from the insulation body along a mating direction is the same as a height of the plurality of signal terminals extending from the insulation body along the mating direction.

3. The connector according to claim 2, wherein the insulation body defines a plurality of first slots arranged in at least one row along a width direction of the insulation body, and the plurality of signal terminals are positioned on both sides of each row of the first slots.

4. The connector according to claim 3, wherein each of the plurality of power supply terminals includes a pin, a plurality of electrical contact points, and a connecting portion connected between the pin and the plurality of electrical contact points.

5. The connector according to claim 4, wherein a section of the connecting portion proximate the electrical contact points has an arc structure.

6. The connector according to claim 4, wherein the pin includes a middle pin and a side pin located on at least one side of the middle pin.

7. The connector according to claim 6, further comprising a welding ball connected to the pin of each of the plurality of power supply terminals.

8. The connector according to claim 7, further comprising a spacer attached to a first side of the insulation body opposite a second side of the insulation body adapted to engage with the mating connector, the spacer having a portion positioned between adjacent welding balls.

9. The connector according to claim 8, wherein the middle pin is formed with a locking portion adapted to interfere with the spacer and prevent the spacer from being separated from the insulation body.

10. The connector according to claim 4, wherein:

the insulation body includes a plurality of second slots divided into two groups, the two groups of second slots are symmetrically located on both sides of the plurality of first slots along a length direction of the insulation body and arranged in at least one row along the width direction of the insulation body; and the plurality of power supply terminals are located on both sides of each row of second slots.

11. The connector according to claim 3, wherein:

each of the plurality of power supply terminals includes a pin and an electrical contact portion extending from the pin, a free end of the electrical contact portion is formed with a raised elastic contact portion; and when the connector and the mating connector are mated, the elastic contact portions of the power supply terminals of the connector are adapted to be in electrical contact with respective electrical contact portions of the power supply terminals of the mating connector.

12. The connector according to claim 1, wherein each of the plurality of power supply terminals is made of a copper plate, the first plate-like portion and the second plate-like portion each having a pin and an electrical contact portion extending from the pin.

13. The connector according to claim 12, wherein the first plate-like portion and the second plate-like portion each comprise an abutting portion located between the pin and the electrical contact portion, the abutting portion is abutted against the insulation body when the power supply terminal is in place in the insulation body.

14. The connector according to claim 13, wherein each of the plurality of power supply terminals is formed in one piece.

15. The connector according to claim 1, wherein the insulation body includes at least one guiding structure adapted to guide the connector and the mating connector during mating.

16. The connector according to claim 15, wherein the guiding structure comprises:

a guiding groove formed at a first end of the insulation body along a length direction and extending in a direction perpendicular to the insulation body; and a guiding column formed at a second end of the insulation body opposite to the first end, the guiding groove and guiding column of the connector adapted to engage with a corresponding guiding column and guiding groove of the mating connect when the connector and mating connector are mated.

17. The connector according to claim 16, wherein two guiding grooves are arranged at intervals in a width direction of the insulation body.

18. The connector according to claim 17, wherein each guiding groove defines an elongated hole having a length direction parallel to the width direction of the insulation body.

19. A connector assembly, comprising:

a connector, including:

an insulation body;

a plurality of signal terminals held in the insulation body; and a plurality of power supply terminals held in the insulation body, each of the plurality of power supply terminals includes a first plate-like portion and a second plate-like portion stacked with the first plate-like portion; and a mating connector, including:

a mating insulation body;

a plurality of mating signal terminals held in the mating insulation body; and a plurality of mating power supply terminals held in the mating insulation body, wherein, with the connector mated with the mating connector, the power supply terminals of the connector are connected in parallel with the mating power supply terminals of the mating connector.

20. The connector assembly according to claim 19, wherein:

the insulation body of the connector defines a plurality of first slots arranged in at least one row along a width direction of the insulation body, and the plurality of signal terminals are positioned on both sides of each row of the first slots;

the insulation body of the connector is provided with a plurality of second slots divided into two groups, the two groups of second slots are symmetrically located on both sides of the plurality of first slots along a length direction of the insulation body and arranged in at least one row along the width direction of the insulation body; and the plurality of power supply terminals of the connector are located on both sides of each row of second slots.

21. A connector, comprising:

an insulation body;

a plurality of signal terminals held in the insulation body;

a plurality of power supply terminals held in the insulation body and adapted to engage with power supply terminals of a mating connector such that the power supply terminals engaged together are connected in parallel; and a spacer attached to a first side of the insulation body opposite a second side of the insulation body and adapted to engage with the mating connector.

22. A connector, comprising:

an insulation body having at least one guiding structure guiding the connector and a mating connector during mating, the guiding structure includes a guiding groove and a guiding column, the guiding groove is formed at a first end of the insulation body and the guiding column is formed at a second end of the insulation body opposite to the first end;

a plurality of signal terminals held in the insulation body; and a plurality of power supply terminals held in the insulation body and adapted to engage with power supply terminals of the mating connector such that the power supply terminals engaged together are connected in parallel.

* * * * *